United States Patent [19]

Gray

[11] 4,131,889
[45] Dec. 26, 1978

[54] MINIATURE DOPPLER RADAR SYSTEMS AND MICROWAVE RECEIVERS SUITABLE THEREFOR

[75] Inventor: Kenneth W. Gray, Malvern, England
[73] Assignee: National Research Development Corporation, London, England
[21] Appl. No.: 766,789
[22] Filed: Feb. 8, 1977
[51] Int. Cl.² .............................................. G01S 9/44
[52] U.S. Cl. .......................................................... 343/8
[58] Field of Search ............. 343/8 (U.S. only), 5 PD

[56] References Cited

U.S. PATENT DOCUMENTS

| | | | |
|---|---|---|---|
| 3,217,323 | 11/1965 | Fackler et al. | 343/8 X |
| 3,234,548 | 2/1966 | Colby, Jr. | 343/8 X |
| 3,314,065 | 4/1967 | Steigerwalt et al. | 343/8 |
| 3,432,855 | 3/1969 | Kalmus | 343/7.7 |
| 3,727,227 | 4/1973 | Takao et al. | 343/7 A X |
| 4,012,730 | 3/1977 | Nicholls | 343/5 PD X |
| 4,035,798 | 7/1977 | Hackett | 343/5 PD |

*Primary Examiner*—Malcolm F. Hubler
*Attorney, Agent, or Firm*—Cushman, Darby & Cushman

[57] ABSTRACT

A doppler radar system comprises a solid state microwave source which is pulsed on and off with a duty cycle typically around $10^{-3}$. The microwaves are transmitted towards a nearby target with a small amount supplied to a mixer also supplied with signals received from the target. The mixer output is passed through a gate opened in coincidence with the mixer pulsed output, and supplied to an integrator whose output forms a doppler signal representing target velocity. Target directionality is found by providing two channels fed in quadrature phase.

7 Claims, 6 Drawing Figures

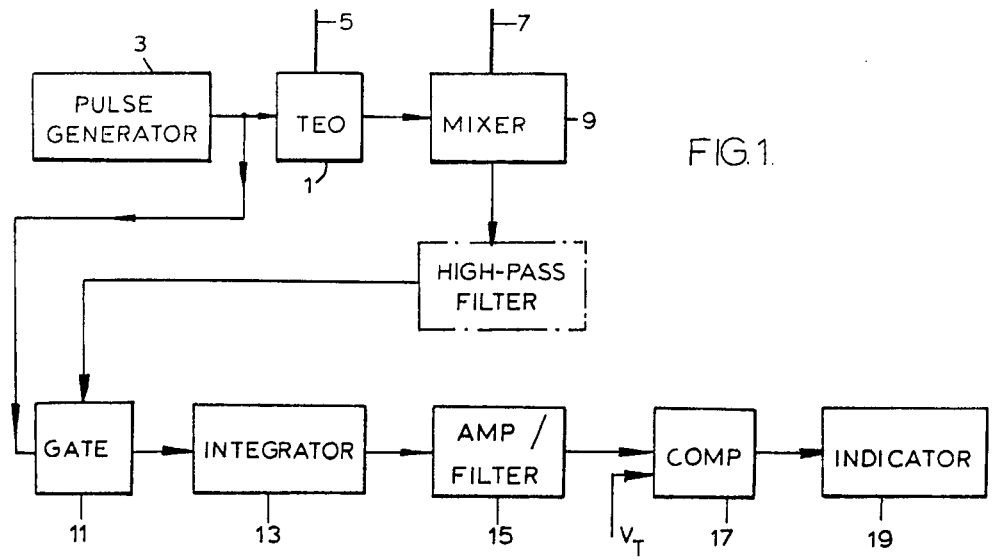
FIG. 1.
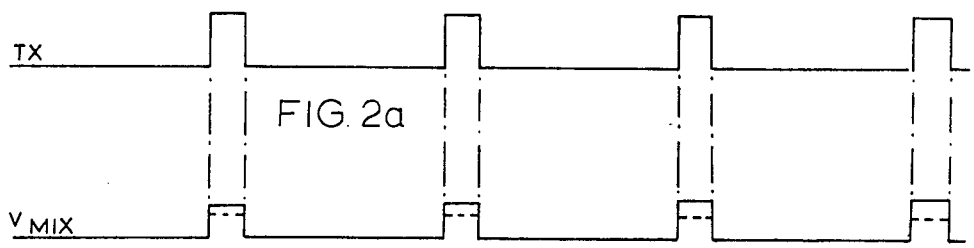
FIG. 2a
FIG. 2b
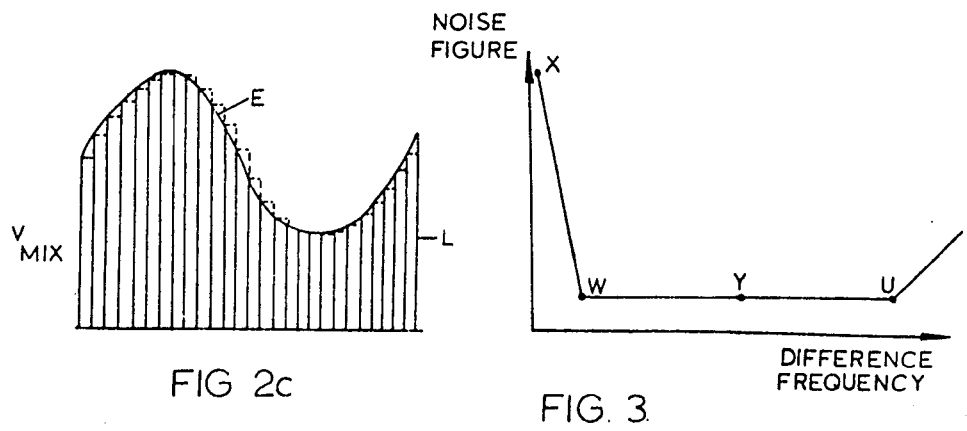
FIG 2c
FIG. 3

MINIATURE DOPPLER RADAR SYSTEMS AND MICROWAVE RECEIVERS SUITABLE THEREFOR

The present invention relates to miniature doppler radar systems and microwave receivers suitable therefor.

Doppler radar systems are well known for the detection of moving objects. A pulsed or CW (continuous wave) radio signal generated by a transmitter source is transmitted by a transmit antenna towards the moving object or target. This signal is reflected by the target and is returned, doppler shifted in frequency, to the receiver of the radar system. This includes a receive antenna, which may or may not be the same as the transmit antenna which picks up the return signal. The receive antenna feeds the return signal to a mixer where it is mixed with a reference signal having the same frequency (in simple systems) as the transmitted signal. The reference signal may be provided either by the transmitter source or by a separate local oscillator. The mixer detects from the return and reference signals a signal at the difference or doppler frequency which can then be used to give an indication of the presence of the moving target.

Since the discovery in recent years of solid state sources which generate in the microwave spectral region, e.g. transferred electron devices (sometimes called Gunn devices), it has been possible to provide miniature doppler radar systems. Such a system for example is described in U.K. Patent Specification No. 1,214,833. Miniature versions are now widely used in low speed short range applications such as intruder alarms and road vehicle detectors.

Known miniature systems operate using CW. Unfortunately the noise associated with the CW detection of low speed objects is very high. Consequently in order to detect a return signal above noise it is necessary to provide powers of 15 mW and 5 mW (at least) for the transmitted and reference signals. Since commercial solid state sources providing this power have a d.c. to microwave conversion efficiency of no more than about 2% a total input d.c. power of 1W is required. This is an unfortunately large power consumption and is usually provided by a mains generated d.c. supply and only in an emergency by a battery. Thus, part of the advantage of miniaturising the system is lost by the size of the power supply.

According to a first aspect of the present invention a microwave receiver suitable for a miniature doppler radar system includes a receive antenna for receiving a signal consisting of pulses of microwave radiation from a distant target, means for generating a reference signal consisting of pulses of microwave radiation coinciding with the received signal pulses, a mixer for mixing the received and reference signals to produce a pulsed electrical output, an electrical pulse integrator, a gate for applying when open the output of the mixer to the integrator, means for opening the gate in a pulsed fashion in coincidence with the mixer output pulses.

According to a second aspect of the present invention a miniature doppler radar system includes a solid state microwave source, pulsing means for repetitively pulsing the source on and off, a transmit antenna for transmitting the microwave signal generated by the source, and a receiver as defined in the first aspect above, the pulsing means constituting a control of the pulsing cycle of the reference signal and also constituting the means for opening the gate.

In the case of this second aspect the signal received by the receive antenna from a distant target consists of reflections from a moving object of the signal transmitted from the transmit antenna.

In the prior art all doppler radar eystems, whether using a pulsed or CW transmitted signal and whether miniature or not, use a CW reference signal for the mixer in their receiver. However, by using a mixer reference signal which is pulsed in combination with a gate, filter and integrator as in the system according to the invention it has been found unexpectedly that the overall d.c. power consumed by the system can be considerably reduced as explained below, without loss in detection performance.

As a consequence the system according to the invention may be battery powered, e.g. by a battery which may be continuously recharged by a solar cell.

The transmitted, received and reference signal pulses may or may not be uniformly long and uniformly spaced. Typically, the pulse length may be 0.1–10 $\mu$sec and the inter-pulse spacing may be 0.1–10 msec, i.e. a duty cycle of $10^{-1}$ to $10^{-5}$.

The means for generating the pulsed reference signal is preferably the microwave source of the system coupled to the mixer via a leakage path. However it may alternatively be an additional solid state microwave source acting as a separate local oscillator but also pulsed on and off by the pulsing means.

The mixer may be a conventional silcon Schottky barrier diode or it may comprise a solid state oscillator which also acts as the source and the reference signal generator.

The integrator may simply be a capacitor and the gate may be a CMOS gate.

The mixer output may be filtered by a high pass filter.

The output of the integrator is preferably connected in turn to a narrow band filter/amplifier for filtering the doppler frequency component of the integrator output, a comparator for comparing the narrow band filter output with a threshold signal, and an indicator for indicating whenever the comparator detects the presence of a signal above noise.

Embodiments of the present invention will now be described by way of example with reference to the accompanying drawings in which:

FIG. 1 is a block schematic diagram of a miniature doppler radar system;

FIGS. 2a, 2b and 2c are waveform diagram illustrating operation of the system shown in FIG. 1;

FIG. 3 is a graph of typical noise figure as a function of mixer difference frequency for a doppler radar system.

Figure 4:
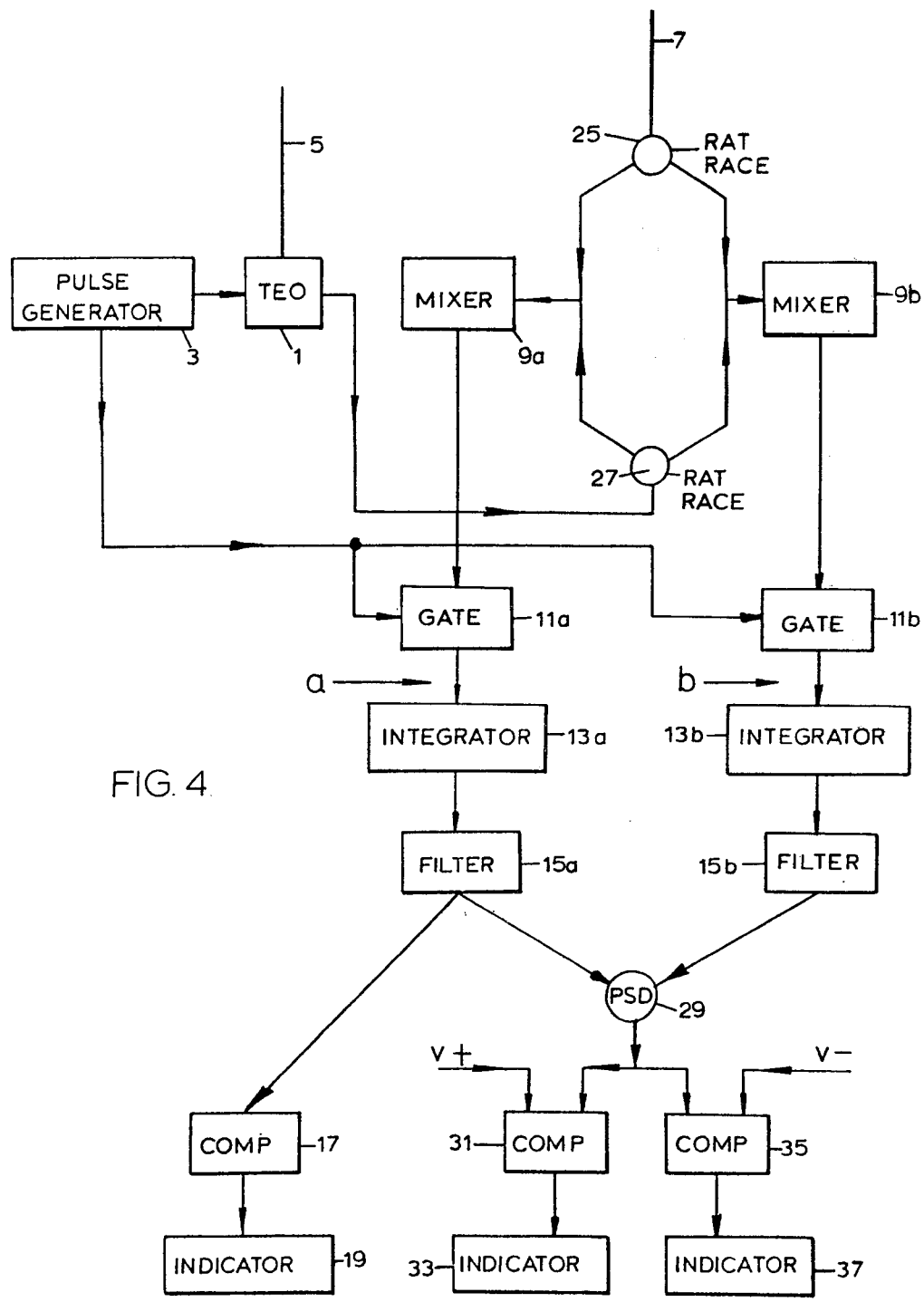
FIG. 4 is a block schematic diagram of a further miniature doppler radar system.

In the system shown in FIG. 1 a transferred electron oscillator 1 is repetitively pulsed on and off by a pulse generator 3. During the pulses (typically 1 $\mu$sec long and 1 msec apart) microwaves (frequency typically 10 GHz) are generated by the oscillator 1 and are fed to a transmit antenna 5 where they are transmitted into free space towards a moving target (not shown). Return signals reflected from the target are picked up by a receive antenna 7 which may or may not be the same as the transmit antenna 5. The return signals are mixed in a mixer diode 9 with a reference signal comprising a fraction of the pulses signal generated by the oscillator 1. The output of the mixer diode 9 consists of pulses which are applied to an integrator 13 via a gate 11, controlled by pulses from the pulse generator 3. The output of the integrator 13 is filtered by a narrow band amplifier/filter 15 and is fed into a comparator 17 where it is compared with a threshold voltage $V_T$. If the output of the amplifier/filter 15 is above the threshold voltage $V_T$ the comparator produces an output which operates an indicator 19.

FIG. 2a shows the pulsed signal amplitude $T_x$ transmitted from the transmit antenna 5 and FIG. 2b shows the corresponding pulsed voltage $V_{mix}$ developed across the mixer diode 9. During a proportion of each transmitted pulse the mixer diode 9 receives a voltage pulse made up of two components. One is a fixed component indicated in FIG. 2b by horizontal dashed lines and is due to the reference signal alone. The other, which adds to the fixed component is a variable component produced by mixing of the reference and return signals. This variable component oscillates in amplitude at the difference or doppler frequency. It is assumed that the return signal is detected before the transmitted pulse has ended, i.e. within 1 $\mu$sec.

FIG. 2c shows the pulses $V_{mix}$ on a reduced timescale where they appear as narrow lines L, and illustrates on an enlarged amplitude scale how the envelope E of their peak varies sinusoidally at the doppler frequency, typically 30 Hz.

The gate 11 opens to coincide with each pulse $V_{mix}$ so that the signal applied to the integrator 13 consists only of the pulses and not the interpulse spaces. Thus each pulse received by the integrator 13 is a sample of the sinewave envelope E shown in FIG. 2c. The integrator 13 integrates these samples and stores them until the next pulse as illustrated by the dashed lines in FIG. 2c. The integrator 13 provides a continuous electrical output signal which varies sinusoidally at the doppler frequency. Non-doppler components are filtered off by the amplifier/filter 15. The comparator 17 compares the amplitude of the remaining low frequency signal with the threshold voltage $V_T$ which is set above the expected noise level so that the indicator 19 only indicates moving targets which give a signal above a pre-determined value.

Although the pulse generator 3 is shown in FIG. 1 as a single unit in practice it will consist of a pulse timing circuit, a gate and a battery, the gate being opened by logic pulses from the timing circuit in a pulsed fashion to apply the battery across the oscillator 1. The logic pulses from the timing circuit also open the gate 11. The timing circuit and the gate 11 may be conventional CMOS circuits. The pulse generator gate may for example be an avalanche transistor circuit or an MOS transistor (e.g. Siliconix VMP 1).

The oscillator 1 is preferably one of the high (15-20%) efficiency devices described in either of U.K. Pat. No. 1,450,998 (Japanese Application No. 38444/75, U.S. Pat. No. 3,977,015) and U.K. Patent Application No. 20218/75 (French Application No. 76 14449, German Application No. P 2620980.3, Dutch Application No. 76 05066, Japanese Application No. 53867/76 and U.S.A. Application No. 685,575). In the first of these Specifications the device has an indium phosphide active layer and a cathode of a silver/gallium/oxygen alloy. In the second Specification the device also has an indium phosphide active layer but the cathode comprises a zone for producing a high electric field, e.g. a Schottky barrier, and between this zone and the active layer a narrow $n^+$ zone.

The oscillator 1, mixer 9, antenna 5 (and antenna 7 if different) may be housed in a single housing unit (not shown) which provides the coupling for the mixer reference signal from the oscillator 1 to the mixer 9. Examples of such units are the Mullard Commercial Doppler Radar Modules CL 8960 and CL8920. In the former the oscillator 1 and mixer 9 are located in two adjacent open-ended waveguides which act as the antennae 5 and 7. Oscillator-mixer coupling is arranged by direct coupling between waveguides. In the latter the oscillator, mixer and a single antenna are connected to the three ports of a microwave ferrite circulator. Oscillator-mixer coupling is provided by signal leakage through the circulator.

The amplifier/filter 15 is preferably an amplifier of the micropower programmable kind e.g., a National Semiconductor LM4250.

The integrator 13 may simply comprise a 2000 pF capacitor.

The indicator may for a instance be a liquid crystal shutter, a light emitting diode, a counter, or a r.f transmitter for transmitting an indicator signal to a remote receiver. The input to the indicator may include a time constant, e.g. C-R circuit, (not shown) which rejects spurious unwanted signals due to momentary movements by objects other than that being detected.

As noted above, pulsing the mixer, e.g. the mixer diode 9 (FIG. 1), in the system according to the invention allows the overall d.c. power consumed and the mean microwave power generated by the system to be reduced without loss in detection performance. The reason for this is as follows. The detection noise 'figure' plotted logarithmically for a typical known homodyne doppler radar system having a CW mixer reference signal varies, as shown in FIG. 3, roughly inversely with the difference frequency detected by the mixer (which may be the doppler frequency alone or added to some intermediate frequency) at difference frequencies below a critical frequency indicated by a point W. However at frequencies above W the noise figure characteristic becomes flat up to a point U above which it has a finite slope again. The point W occurs between about 10 kHz and 1 MHz depending on the mixer and point U (which may not be an exact point in practice) occurs at roughly 100 MHz.

Since commercial miniature doppler radar systems detect relatively low target velocities and hence low difference frequencies their noise figure is very high as illustrated by point X in FIG. 3.

However when the mixer reference signal is pulsed as in the system shown in FIG. 1 the noise figure is not that indicated by point X but is an average taken by a simple out to point Y. This sample is a comb structure of interval of the pulse repetition rate with a (sin X)/X envelope, the first minimum being at the inverse of the pulse width (typically 1 MHz). This spectrum which is the Fourier transform of the pulse waveform shown in FIG. 2b is passed through the gate 11 which opens in synchronism with this waveform and is therefore a matched filter to the pulsed mixer waveform. Thus the overall noise figure reduction is considerable compared with the CW mixer reference signal case. The consequent reduction in input d.c. power for the same performance can be several orders of magnitude. Additionally as the noise of the mixer is very high at the low frequency end as indicated in FIG. 3 a high pass filter 10 with corner frequency of the order of frequency W may be introduced between the mixer 9 and the gate 11 to further improve the overall noise performance.

For a 1 kHz train of pulses 1 μsec long from a 20% efficient 10 GHz transferred electron device a mean d.c. power of only about 0.3 mW has been found suitable for providing adequate detection of short range low speed targets by the system shown in FIG. 1. The remainder of the system consumes a comparable power. Thus the system may be powered from a 1.5 1Ahr mercury battery continuously for about 3 years.

A further unexpected advantage of the system shown in FIG. 1 concerns the effect of interference between two radars operating in the same locality, i.e. picking up unwanted signals from one another. With commercial CW miniature doppler radars this problem is very difficult to avoid and complex FM facilities need to be incorporated in the radars to minimise the interference. However because the pulses in the system shown in FIG. 1 have a low duty cycle (typically $10^{-3}$) they have a low statistical probability of interfering with other identical systems. Furthermore the transmitted pulses from such systems are all out of phase with one another and the return pulses are detected coherently. Even if one system detects an unwanted pulse transmitted by another system the next unwanted pulse would have a random phase compared with the pulsing cycle of the radar receiving it. Thus, for this next pulse the output of the filter 15 would simply be extra noise. The RMS amplitude of this noise can be minimised by broadening the system bandwidth simply by changing the frequency of the oscillator 1.

Analysis has shown that for a target at a range of 10 meters the change in frequency of a 1 μsec microwave pulse can be 5 MHz without serious degradation of signal-to-noise. This accuracy of frequency stabilisation can readily be achieved with simple conventional waveguide circuits.

In a modification of the system shown in FIG. 1 a separate or local transferred electron oscillator (not shown) may be used to provide the mixer pulsed reference signal, the local oscillator being pulsed on and off contemporaneously with the oscillator 1 by the pulse generator 3.

Target speed may be measured simply by measuring the frequency of the output signal from the filter 15.

It has been assumed in the description of the system shown in FIG. 1 that the time for a signal to be received from a moving target (½ velocity of radiation x target range) is less than the microwave pulse length, typically 1 μsec. This means that target selection is achieved by limiting the expected target range, viz 150 m for 1 μsec pulse. However in a further modification of the FIG. 1 system opening of the gate 11 and pulsing on of the mixer 9 by the reference signal may be delayed by a delay or by a secondary pulse from the source 1 switched to the mixer 9 only with the transmit antenna isolated in order to detect targets having a longer range.

FIG. 4 illustrates a further modification of the FIG. 1 system. The system is adapted in a conventional way to provide target directionality information. Instead of the single detector channel which includes the mixer 9, gate 11, integrator 13 and amplifier/filter 15 shown in FIG. 1, the FIG. 4 system has a pair of channels a and b both having these components, the components being labelled with reference symbols a and b accordingly. In this case the return signal detected by the receive antenna 7 is divided into two signals by a rat race 25 which is a device which also shifts the phase of one of the signals. One signal is supplied with zero phase change, to one mixer 9a whilst the other signal is supplied with a relative ± 90° phase change to the other mixer 9b. Pulsed reference signals from the oscillator 1 are similarly fed in phase and in quadrature phase to the mixers 9a and 9b respectively by a rat race 27. Detection of the doppler signal occurs separately in the a and b channels in the way described above with reference to FIGS. 1, 2 and 3, by opening gates 11a and 11b contemporaneously. The output of one of the two filters 15, e.g. the filter 15a as shown, is applied to the comparator 17 and indicator 19 as in the FIG. 1 system. The outputs of both filters 15a and 15b are also mixed together in a phase sensitive detector 19 whose output is applied to two parallel comparators 31 and 35 operating indicators 33 and 37 respectively.

The output from the phase sensitive detector 29 consists of a d.c. signal whose sign depends on the directionality of the detected target according to known theory. When this output is positive and greater than a threshold $V_+$ the indicator 33 is operated by the comparator 31 to show that the target is approaching. When the output is negative and greater than a threshold $V_-$ the indicator 37 is operated by the comparator 35 to show that the target is receding.

Miniature doppler radar systems embodying the invention described above may be used in any of the following known applications:

(1) microwave intruder alarms, e.g. for shops, using a single transmitted microwave beam;
(2) microwave boundaries, e.g. for factories, comprising a plurality of microwave intruder alarms whose beams overlap with one another to define a security fence;
(3) vehicle speed meters;
(4) vehicle counters;
(5) toll booth regulators;
(6) revolution counters in vehicle testing;
(7) collision avoidance system;
(8) automatic vehicle control;
(9) automatic traffic lights;
(10) railway speedometers and position detectors (particularly for advanced passenger trains);
(11) railway point switching
(12) marshalling yard speed controls;
(13) diagnostic devices, e.g. for material inspection or turbine blades;
(14) grinding wheel peripheral speed measurement;
(15) steel rolling mills;
(16) mineshaft cage speed measurement;
(17) bridge vibration detection;
(18) docking of large ships, particularly tankers;
(19) respiration detection in animals and humans;
(20) helmet mounted radars;
(21) people counters;
(22) crane collision avoidance;
(23) lift controls;
(24) automatic lighting;
(25) aircraft runway monitors;
(26) boat and ship speedometers and radars;
(27) rate of climb indicators;
(28) altimeters.

Although the microwave receiver according to the first aspect of the invention defined above is primarily intended or use as a miniature doppler radar receiver it may also be used in analogous systems. For example it may be used as a receiver in a microwave communication system, e.g. for speech. In this case the received signal from the distant target is a signal from a remote transmitter modulated, e.g. in amplitude, with the necessary information. In this case a reference signal local oscillator and the gate opening must be synchronised by e.g. the receipt of radio frequency command pulses from a central command unit or by a master-slave hunting circuit. Such a system would probably be most useful in a high noise environment where ear protection is normally provided, e.g. by helmets.

I claim:

1. A doppler radar system comprising a solid state microwave source, pulsing means for repetitively pulsing the source on and off, a transmit antenna for transmitting the microwave signal generated by the source, a receive antenna for receiving reflections for a moving object of signals transmitted from the transmit antenna, said source generating a reference signal consisting of pulses of microwave radiation coinciding with at least a proportion of the received signal pulses, a mixer connected to said source via a leakage path for mixing the received and reference signals to produce a pulsed electrical output, an electrical pulse means for providing a doppler signal output from the successive amplitude values of a pulsed input signal, a gate for applying when open the output of the mixer to the providing means, and means for opening the gate in a pulsed manner in coincidence with the mixer output pulses.

2. A doppler radar system according to claim 1 and further comprising a narrow band filter amplifier for amplifying the output of said providing means, and a comparator for detecting a doppler signal above a noise level.

3. A doppler radar system according to claim 2 and further comprising means for indicating a doppler signal from the comparator output.

4. A doppler radar system according to claim 1 and further comprising a delay means for delaying reference pulses applied to the mixer whereby the range at which targets may be detected is increased.

5. A doppler radar system according to claim 1 comprising a high pass filter connected between the mixer and gate.

6. A doppler radar system according to claim 1 wherein the mixer is a diode.

7. A doppler radar system according to claim 1 comprising two channels for receiving signals from the receive antenna, means for supplying signals to the two channels in quadrature phase relation, and means for comparing the two channel outputs to determine target directionality; each channel comprising a mixer for mixing reference and received signals, means for providing a doppler signal output from the successive amplitude values of a pulsed input signal, a gate for applying the mixer output to the providing means, and means for opening the gate in a pulsed manner in coincidence with the mixer output pulses.

* * * * *